United States Patent
Blackburne, Jr.

(10) Patent No.: US 7,287,684 B2
(45) Date of Patent: Oct. 30, 2007

(54) FILTER CARTRIDGE ASSEMBLY AND METHOD OF MANUFACTURE

(75) Inventor: Edward F. Blackburne, Jr., Conroe, TX (US)

(73) Assignee: Tubular Perforating Mfg., Ltd., Conroe, TX (US)

(*) Notice: Subject to any disclaimer, the term of this patent is extended or adjusted under 35 U.S.C. 154(b) by 150 days.

(21) Appl. No.: 10/427,769

(22) Filed: Apr. 30, 2003

(65) Prior Publication Data

US 2004/0004110 A1 Jan. 8, 2004

Related U.S. Application Data

(60) Provisional application No. 60/393,979, filed on Jul. 3, 2002.

(51) Int. Cl.
  *B23K 31/00* (2006.01)
  *B23P 15/00* (2006.01)

(52) U.S. Cl. ............ 228/130; 228/17.7; 228/136; 228/145; 228/173.6; 29/896.62; 55/489; 55/520; 72/368; 72/497.1; 166/231; 166/233; 166/236

(58) Field of Classification Search ........... 228/130; 29/896.6, 896.62, 902; 72/356, 368; 210/497.01, 210/498, 499; 55/488, 489, 520, 525, 526; 166/369, 228, 233, 236
See application file for complete search history.

(56) References Cited

U.S. PATENT DOCUMENTS

| | | |
|---|---|---|
| 1,342,986 A | 6/1920 | Cater |
| 1,367,406 A | 2/1921 | McLean |
| 2,217,370 A | 10/1940 | Johnston |
| 2,530,223 A | 11/1950 | Breaux |
| 4,101,423 A | 7/1978 | Merrill et al. |
| 4,141,481 A * | 2/1979 | Van Petten .......... 228/145 |
| 4,475,973 A * | 10/1984 | Tanaka et al. ......... 156/184 |
| 4,877,527 A | 10/1989 | Brownell |
| 4,902,417 A | 2/1990 | Lien |
| 5,039,413 A * | 8/1991 | Harwood et al. ........ 210/457 |
| 5,114,582 A * | 5/1992 | Sandstrom et al. ..... 210/321.74 |
| 5,230,726 A | 7/1993 | Smith et al. |
| 5,252,207 A * | 10/1993 | Miller et al. ........ 210/335 |
| 5,460,721 A | 10/1995 | Goodwin |
| 5,664,628 A | 9/1997 | Koehler et al. |
| 5,673,483 A | 10/1997 | Hock et al. |
| 5,711,879 A | 1/1998 | Carlson |
| 5,743,560 A | 4/1998 | Jackson et al. |
| 5,833,853 A | 11/1998 | Carlson |

(Continued)

FOREIGN PATENT DOCUMENTS

EP 0568381 A 11/1993

(Continued)

*Primary Examiner*—Kiley Stoner
(74) *Attorney, Agent, or Firm*—Conley Rose, P.C.

(57) ABSTRACT

An apparatus for filtering well fluids and method of manufacture is disclosed. The apparatus comprises an inner support, a filter spirally wrapped around the inner support, and an outer support wrapped around the filter enclosing the filter between the inner and outer supports. The filter has longitudinal edges which overlap and the filter is held in place by friction with the inner and outer supports. The method of manufacturing the apparatus comprises continuously and simultaneously wrapping a filter and outer support around an inner support and disposing the filter between the outer and inner supports.

32 Claims, 4 Drawing Sheets

U.S. PATENT DOCUMENTS

| | | |
|---|---|---|
| 5,881,812 A | 3/1999 | Malbrel et al. |
| 5,979,551 A | 11/1999 | Uban et al. |
| 5,980,745 A | 11/1999 | Voll et al. |
| 5,992,518 A | 11/1999 | Whitlock |
| 6,006,829 A | 12/1999 | Whitlock et al. |
| 6,068,771 A | 5/2000 | McDermott et al. |
| 6,305,468 B1 | 10/2001 | Broome et al. |
| 6,382,318 B1 | 5/2002 | Whitlock |
| 6,391,200 B2 | 5/2002 | Pulek et al. |

FOREIGN PATENT DOCUMENTS

| | | |
|---|---|---|
| GB | 1549807 | 8/1979 |

* cited by examiner

SECTION A-A

FILTER CARTRIDGE ASSEMBLY AND METHOD OF MANUFACTURE

CROSS-REFERENCE TO RELATED APPLICATIONS

The present application claims the benefit of U.S. Provisional Application Ser. No. 60/393,979, filed Jul. 3, 2002, entitled Filter Cartridge Assembly and Method of Manufacture, which is hereby incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates to the filtering of fluids, and more particularly to the filtering of well fluids. Still more particularly, the present invention relates to the method of manufacturing of such filters.

2. Background and Related Art

Well filters are typically used in subterranean environments in which it is desired to remove a liquid or gas from the ground without bringing soil particulates, such as sand or clay, up with the liquid or gas. A well filter generally includes an inner support member, such as a perforated core, and a filter body including a filter medium disposed around the inner support member. In many cases, the well filter will further include an outer protective member, such as a perforated cage or shroud, disposed around the filter body for protecting it from abrasion and impacts. A filter for subterranean use is described in U.S. Pat. No. 6,382,318, hereby incorporated herein by reference. A downhole screen and method of manufacture is described in U.S. Pat. No. 5,305,468, hereby incorporated herein by reference.

In order to facilitate installation of the cage over the filter body, there is usually a clearance between the outer periphery of the filter body and the inner periphery of the outer protective member. This clearance between the filter body and the outer protective member or shroud is problematic. During use of the well filter in a well, fluid will usually flow radially inwards through the filter body. However, on occasions, such as during acidizing of a well, injection of mud into a well, air sparging, or momentary pressure reversals, fluid may flow radially outwards through the filter body, producing harmful hoop stresses which stretch the filter medium in the filter body outwards toward the outer shroud. Because of the clearance between the filter body and the cage, there is a likelihood of the hoop stresses exceeding the strength of some or all portions of the filter body and producing excessive plastic elongation of the filter medium or damage to seams or joints of the filter body.

It is known in the art to form the outer shroud separately from the filter body and slide it over an end of the inner support member until it surrounds the filter body. After the shroud is disposed around the filter body, the shroud is plastically deformed radially inwardly to reduce the inner diameter of the shroud to a value such that the filter body can expand against the shroud. This process is also know as "swaging," and is typically achieved using a reducing mill or die. Swaging has several drawbacks, making it an undesirable step which should be avoided in manufacturing well filters. First, it adds to the time and expense of manufacturing the filter. Second, it deforms the outer shroud, putting additional stresses on the shroud and affecting its material makeup. Third, swaging does not guarantee that the clearance between the filter body and the shroud has been properly eliminated, or that the pressure on the filter body is desirable, especially considering the "spring-back" phenomenon. Spring-back occurs when the outer shroud expands slightly after the radial inward force exerted by the mill or die has been released.

Other common practices in the well filter industry also cause problems in manufacturing well filters. Often times the filter body, typically a mesh screen, is hand wrapped around the inner support. However, it is not possible to hand wrap the filter body as tight as is necessary, thereby creating unwanted slack in the filter. To combat this problem, the filter body is wrapped around the inner support longitudinally and a lengthwise weld is applied at the seam. Typically, a plasma or laser weld is used at the seam so as not to bum the fine mesh. However, this is time-consuming and expensive. Also, regardless of the type of weld used and care taken, welding causes the mesh in and around the weld to draw together, thereby causing the filter to bend and contort in undesirable ways. The weld also weakens the area around the weld and, over time, can cause erosion and breakage.

In prior art filters and methods, the filter body is usually bound to the inner support using a variety of techniques, including chemical glues and heat. In a process called sintering, the filter body is heated after it is in contact with the inner support. However, this technique does not bind the filter body to the inner support properly, and additionally plugs some of the small holes in the filter mesh and shrinks the filter body.

The industry would welcome a filter and method of manufacturing such a filter that eliminates the problems found with conventional filters and methods. The present invention overcomes the deficiencies of the prior art.

SUMMARY OF THE PREFERRED EMBODIMENTS

An apparatus for filtering well fluids comprises an inner support; a filter spirally wrapped around the inner support; and an outer support wrapped around the filter enclosing the filter between the inner and outer supports. The filter has longitudinal edges which overlap and the filter is held in place by friction with the inner and outer supports.

A method of manufacturing a filter comprises continuously and simultaneously wrapping a filter and outer support around an inner support; and disposing the filter between the outer and inner supports. The method further includes overlapping edges of the filter where the overlapping edges are not welded. The method further includes welding the edges of the outer support. The wrap is spiral around the inner support and the filter is held in place by frictionally engaging the inner and outer supports.

The features and characteristics mentioned above, and others, provided by the various embodiments of this invention will be readily apparent to those skilled in the art upon reading the following detailed description of preferred embodiments, and by referring to the accompanying drawings.

BRIEF DESCRIPTION OF THE DRAWINGS

For a detailed description of a preferred embodiment of the invention, reference will now be made to the accompanying drawings wherein.

NOTATION AND NOMENCLATURE

Figure 1:
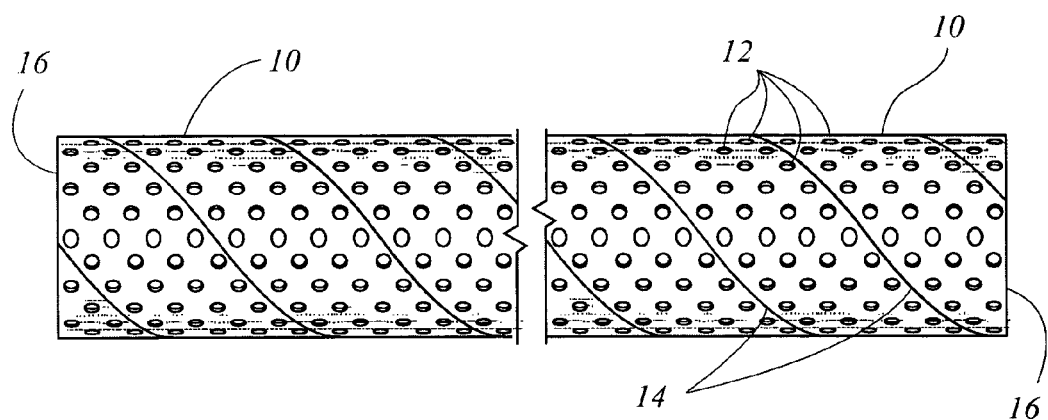
FIG. 1 is a side elevational view of an embodiment of a filter cartridge assembly according to the present invention.

In the following discussion and in the claims, the terms "including" and "comprising" are used in an open-ended fashion, and thus are to be interpreted to mean "including, but not limited to . . . ".

The present invention is susceptible to embodiments of different forms. There are shown in the drawings, and herein will be described in detail, specific embodiments of the present invention, including its use as a filter cartridge assembly for separating contaminants from a liquid in which the contaminants are suspended. This exemplary disclosure is provided with the understanding that it is to be considered an exemplification of the principles of the invention, and is not intended to limit the invention to that illustrated and described herein. In particular, various embodiments of the present invention provide a number of different constructions and methods of operation. It is to be fully recognized that the different teachings of the embodiments discussed below may be employed separately or in any suitable combination to produce desired results.

Reference to up or down will be made for purposes of description with "up," "upward," or "upper" meaning toward the surface of a well and "down," "downward," or "lower" meaning toward the bottom of a well.

DETAILED DESCRIPTION OF THE PREFERRED EMBODIMENTS

A number of embodiments of a filter cartridge assembly according to the present invention will now be described with reference to the accompanying drawings. Referring initially to FIG. 1, the filter cartridge assembly 10 is shown with perforations 12 and spiral welds 14. Referring also to FIG. 4, it can be seen that filter cartridge assembly 10 includes an inner support member 20, a filter body 36 surrounding inner support member 20 and containing a filter medium 30 (seen in FIGS. 2 and 3), and a restraining member in the form of an outer shroud 40 surrounding filter body 36 for preventing damage to the filter medium 30 in filter body 36 when filter body 36 is subjected to radially-directed forces.

Inner support member 20 provides rigidity to filter assembly 10 and serves to axially transport fluid between filter assembly 10 and another member to which filter assembly 10 is connected. For example, when the filter is used for outside-in filtration, inner support member 20 can transport filtrate (the filtered liquid) which has passed through filter body 36 to another member, such as a pipe string, connected to inner support member 20 for transporting the filtrate outside the well. Alternatively, filter assembly 10 may be manufactured without inner support member 20 if the other member to which filter assembly 10 is attached, such as a pipe string, is correctly configured to receive filter body 36 and transport the fluid filtrate to the inner portion of the pipe string.

Typically inner support member 20 is a hollow, tubular member and has perforations 24, such as holes, pores, slits, or other openings of any desired shape, in its peripheral wall which permit fluid to flow into the central flowbore of inner support member 20. Inner support member 20 need not be cylindrical as long as it is capable of transporting filtrate. For example, it may be a solid, porous member through which filtrate can flow axially, or it may be a solid member having axial channels in its outer surface for the transport of fluid. For reasons of strength, it is usually cylindrical, but other shapes may be employed, such as a shape with a polygonal or oval cross section, and the cross section may vary along its length. Preferably, inner support member 20 is a cylindrical steel tube having a uniform circular cross section over most of its length and having perforations 24 for filtrate formed over a portion of its length in a region on which filter body 36 is mounted. Also, inner support member 20 is spirally wrapped and welded, resulting in spiral welds similar to welds 14 in FIG. 1. The spiral welds help inner support member 20 withstand the pressures on filter assembly 10 during use.

Inner support member 20 can be made of any material capable of withstanding the conditions to which inner support member 20 is to be subjected during installation and use. If inner support member 20 is expected to be subjected to only low tensile, torsional, or radial compressive forces, light-weight lockseam tubing or polymeric tubing may be employed for inner support member 20. If inner support member 20 is to be used in a well for oil or gas, inner support member 20 will typically be made from a length of spiral-welded steel tube so that it can withstand the very high compressive forces which may be encountered in such wells. If filter body 36 is sufficiently strong, it may be possible to omit the inner support member 20. If the filter assembly 10 is to be installed at the tail end of a pipe string or other conduit, the lower end of inner support member 20 may be closed off with a bull plug or similar member.

The length of inner support member 20 may vary according to the user's specifications, and almost any length may easily be accommodated according to the method of the present invention, to be more fully described hereinafter. After inner support member 20 has been sized and cut, the ends 26 of inner support member 20 will be generally flat and unfinished. Minimal milling, grinding, or polishing may be needed to prepare the ends 26 for welding to another member, such as a production pipe. Alternatively, inner support member 20 may be equipped with connecting portions at one or both ends to enable inner support member 20 to be connected to other members. For example, ends 26 may be threaded pin or box ends which can be threaded into the threaded pin or box ends of a pipe or into a standard pipe connector for joining two pipes. However, connecting portions increase the time and expense of manufacturing inner support member 20 as well as the members to which inner support member 20 is to be attached. It is preferable to manufacture inner support member 20 so that it may be welded to other members.

Figure 2:
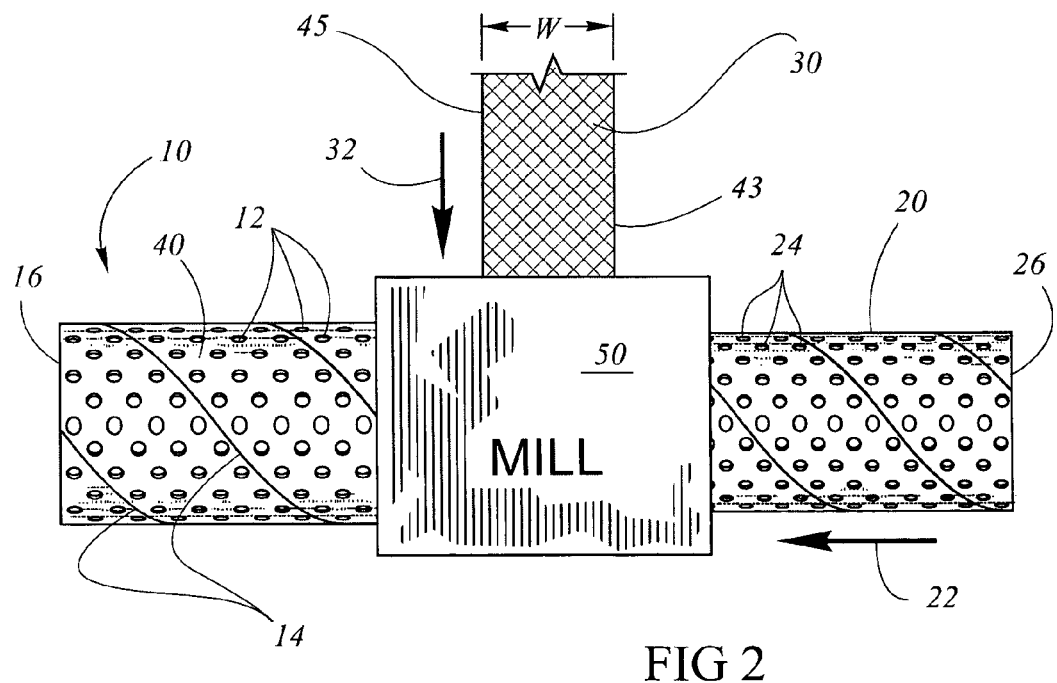
FIG. 2 is a schematic in elevational of the components of the filter cartridge assembly having been inserted into a mill to produce the filter cartridge assembly of FIG. 1.
Figure 3:
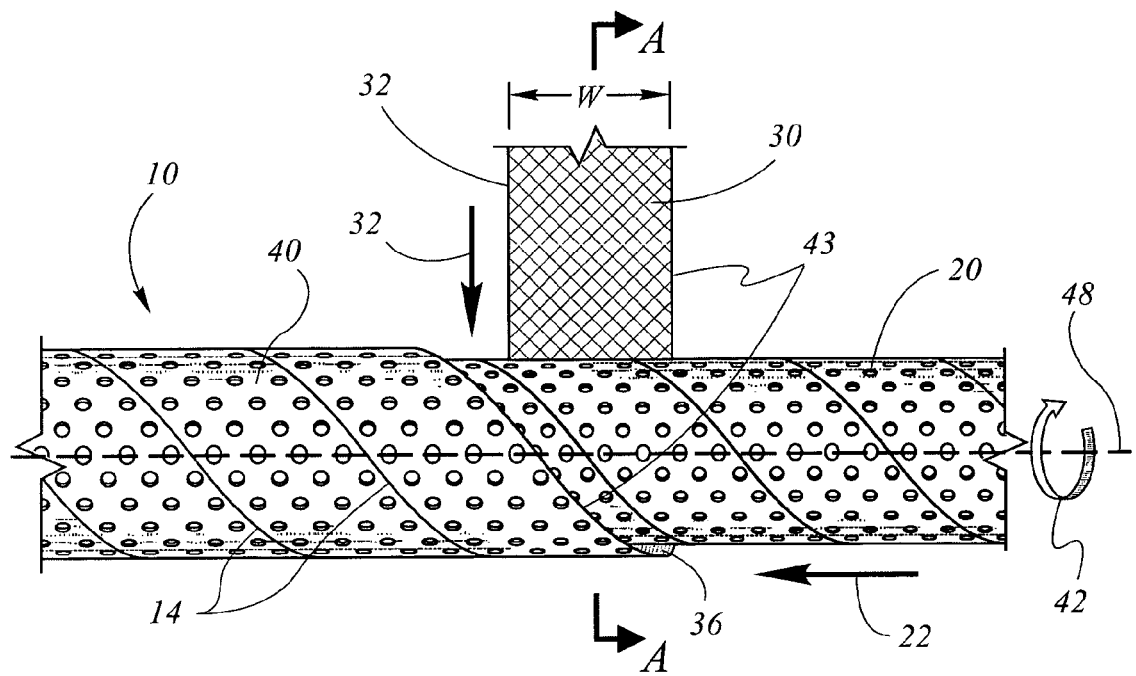
FIG. 3 is a side elevational view of the partially formed filter cartridge assembly of FIG. 2 without showing the mill.
Figure 4:
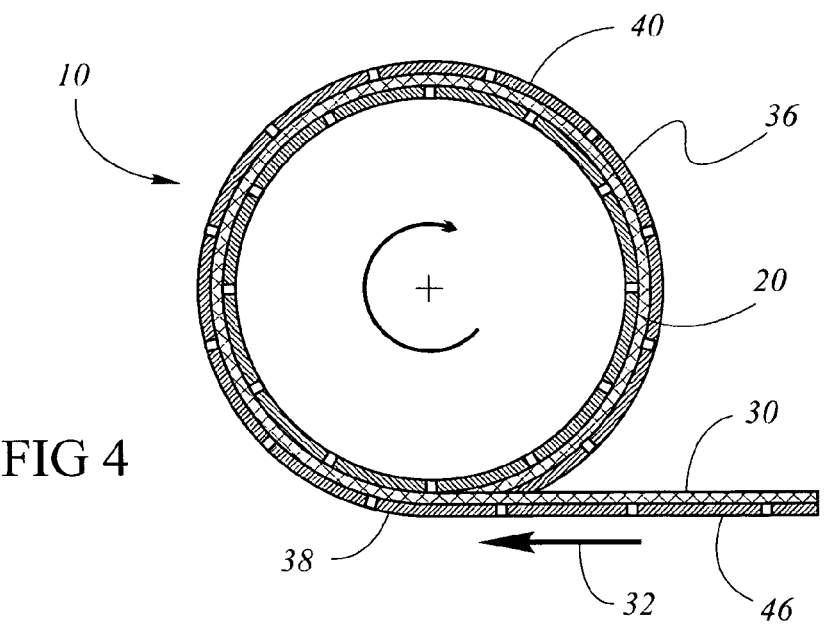
FIG. 4 is a cross-sectional view of the partially formed filter cartridge assembly of FIG. 3 taken along the place A-A.

Referring now to FIGS. 2-4, filter body 36 contains a filter medium 30 which in the present embodiment is used to filter a well fluid, although the filter medium may be used to filter any contaminant from any liquid, or for other fluid treatment purposes, such as for coalescing or formation of air bubbles (sparging). Filter body 36 may have any structure capable of performing the intended removal of substances from the fluid being filtered or other type of fluid treatment and may employ any desired type of filter medium, such as meshes, membranes, perforated sheets or plates, wire wrap, or porous bodies comprising particles coated and held together by a binder. Filter medium 30 will usually be one which is capable of resisting a tensile stress, as opposed to a filter medium comprising loose particles packed into an annular space. Filter medium 30 may be made of any suitable material, including but not being limited to metals and polymers.

In addition to some type of filter medium 30, the filter body 36 may include a variety of other components, such as drainage layers to assist the flow of the fluid into the filter medium and the flow of filtrate into inner support member 20, cushioning layers to prevent abrasion of the filter medium, diffusion layers placed between layers of filter medium to permit edgewise flow of fluid, and layers for selectively blocking flow through portions of filter body 36. The structure and use of these and other components of a filter body are well known to those skilled in the art.

Before filter medium 30 becomes incorporated into filter body 36, it is typically a flat sheet of mesh or other material from which particular sizes of sheets may be cut. A typical sheet has a width and a substantial length rolled into a coil. Filter medium 30 is incorporated into the filter cartridge assembly 10 via the process described hereinafter. Other components may be added to or around filter medium 30 during this process, thereby creating the formed filter body 36 of filter assembly 10.

Referring to FIGS. 2-5, outer shroud or restraining member 40 surrounds filter body 36. Before being incorporated into filter cartridge assembly 10, shroud 40 is a flat metal sheet 46, as seen in FIG. 4. Metal sheet 46 is preferably made of a material which is impervious to the fluid being filtered and the contaminants contained therein. Therefore, outer shroud 40 is preferably made of stainless steel. Sheet 46 is also formed with perforations 12, such as holes, pores, slits, or other openings of any desired shape, through which the fluids to be filtered can flow to reach and flow through the filter body 36.

Outer shroud 40 serves a variety of functions. One function is to protect filter body 36 against erosion, abrasion, and impacts, either during installation or operation of filter assembly 10 underground. Another function is that of a restraining member which restrains filter body 36 against radial expansion due to radially outward forces acting on filter body 36 so as to limit the elongation (expressed as strain) of filter body 36. Filter body 36 has a maximum allowable elongation defined as the highest elongation at which filter body 36 can still remove particles of a given size with a desired efficiency. Preferably, restraining member 40 limits the elongation of filter body 36 to less than the maximum allowable elongation by a safety factor. In addition to restraining filter body 36, outer shroud 40 must exert enough radially inward force on filter body 36 so as to create a frictional engagement or bind between shroud 40 and filter body 36, and between inner support member 20 and filter body 36. Preferably, filter body 36 is in substantial contact with but not connected to inner support member 20 or shroud 40.

The frictional engagement or bind between the inner and outer surfaces of filter body 36 and inner support member 20 and outer shroud 40, respectively, is required for several reasons. First, preferably, filter assembly 10 has no connecting portions at its ends connecting inner support member 20, filter body 36, and outer shroud 40. Thus the frictional bind holds the separate pieces together without connecting means on the ends 16 of filter assembly 10. Second, it is beneficial for filter body 36 to resist movement in the lengthwise direction of filter assembly 10 in response to axial forces. Lastly, frictional engagement will tend to prevent fluid from bypassing filter body 36 by flowing between filter body 36 and inner support member 20 or outer shroud 40.

Referring now to FIGS. 2-5, the process of manufacturing filter cartridge assembly 10 generally includes simultaneously wrapping filter media 30 and metal sheet 46 for outer shroud 40 around inner support member 20 in a spiral or helical fashion so as to dispose filter media 30 between inner support member 20 and outer shroud 40 once shroud 40 has been formed and welded from metal sheet 46. As metal sheet 46 is spirally wrapped around inner support member 20, it is automatically welded at seams 14. Filter media 30 is overlapped but not welded. Thus, only outer shroud 40 is being welded, and not filter body 36.

Referring to FIG. 2, a pre-formed perforated tube is used as inner support member 20, and is fed into a mill 50 in the direction of arrow 22. As described above, the pre-formed inner support member 20 is preferably spirally wrapped and welded to provide flexibility and strength in response to the pressures encountered by filter assembly 10 during installation and use. As one of the ends 26 of inner support member 20 continues to be fed into mill 50, mill 50 engages inner support member 20 and continues to move support member 20 in the direction of arrow 22. At the moment of engagement, referring now to FIGS. 3 and 5, mill 50 begins to rotate support member 20 in the direction of arrow 42 around longitudinal axis 48.

Figure 5:
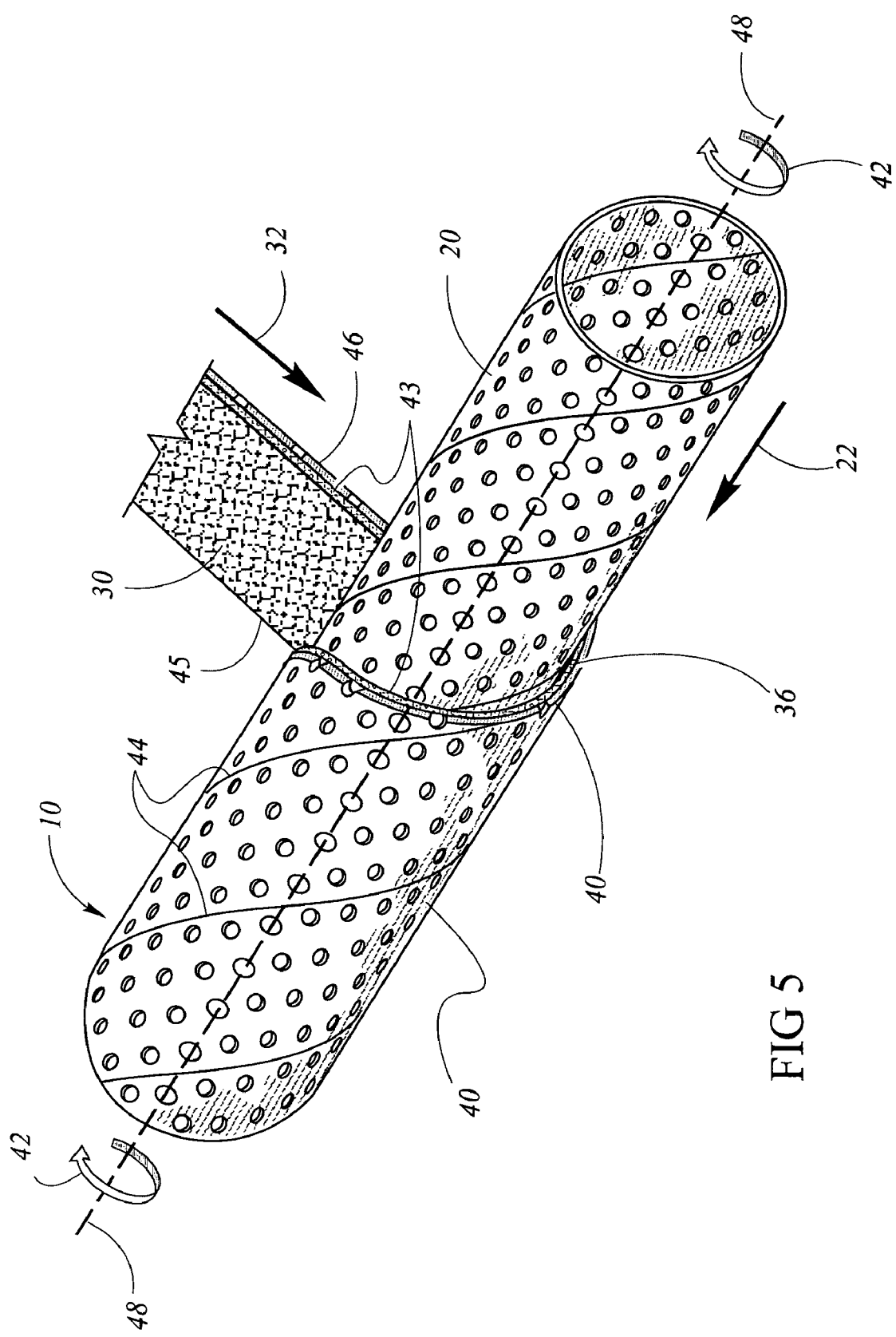
FIG. 5 is a perspective view of the partially formed filter cartridge assembly of FIG. 3.

Referring now to FIGS. 2-5, subsequent to the engagement of support member 20 by mill 50, a combination of filter medium 30 and perforated metal sheet 46 are fed into mill 50 according to arrow 32, as seen in FIG. 2. In FIGS. 4 and 5, it can be seen that filter medium 30 is a flat sheet or layer of wire mesh having a predetermined width, or any of the various materials that filter medium 30 may be comprised of, laid over the top of metal sheet 46, which may comprise any of the various materials that outer shroud 40 may be made of. It should be understood that multiple layers of filter medium 30 may be laid over the top of metal sheet 46 at one time. In FIGS. 2 and 3, the width w of filter medium 30 may be the same as the width of sheet 46, or it may be smaller or larger. In a preferred embodiment, a plurality of layers of filter media 30 is used wherein the width of each layer is no larger than the width of sheet 46. Also, each layer is staggered or offset laterally from the layer above and/or below it so that the edges of the multiple layers do not align. Consequently, when metal sheet 46 and filter media 30 are spirally wrapped, a mechanical seal is created within the filter body 36, which will be more fully described hereinbelow.

Mill 50 also engages filter sheet 30 and metal sheet 46, and continues to move them in the direction of arrow 32. Referring now to FIGS. 3-5, the spiral wrapping process is illustrated. As sheets 30 and 46 come into contact with inner support member 20, mill 50 forms metal sheet 46 into outer shroud 40, thereby also shaping filter sheet 30 into filter body 36. FIG. 4 illustrates a cross section of the forming process, with arrow 32 showing the movement of filter medium sheet 30 laid over the top of metal sheet 46. At location 38, the mill (not shown) forms sheet 46 into outer shroud 40 by cold-rolling the metal or other material, thereby forming and trapping filter body 36 between inner support member 20 and outer shroud 40. Arrow 42 represents the rotational movement of inner support member 20, filter body 36, and outer shroud 40, which all combine to form filter cartridge assembly 10. It should be noted that rotational movement 42 may be clockwise or counter-clockwise depending on the spiral mill orientation.

The simultaneous advancement and rotation of inner support member 20 through mill 50 as sheet 30 and sheet 46 are cold-rolled around support member 20 creates the spiraling of outer shroud 40. If necessary, sheets 30 and 46 may be fed into mill 50 at an angle in relation to longitudinal axis 48, rather than at a right angle as seen in FIG. 3, to enhance the spiral wrapping process. Sheets 30 and 46 may be advanced into mill 50 at a prescribed angle, the angle depending on the outer diameter of inner support member 20 and the width of sheet 46.

Preferably each wrap of outer shroud 40 is flush with the immediately preceding wrap, thereby forming seams 14 as seen in FIGS. 2, 3, and 5. As each new wrap of cold-rolled outer shroud 40 is formed flush with the immediately preceding wrap, mill 50 automatically welds the outer shroud 40 at seams 14. The weld may be any of the various types of welds know in the art, although a fusion-type weld is preferred. It is not necessary to weld filter body 36 once outer shroud 40 has been welded.

As mentioned hereinbefore, frictional engagements or binds hold filter cartridge assembly 10 together once the forming and welding processes have been completed. To ensure frictional engagement, several steps are taken. First, the thickness or gage of filter medium 30 is determined. This measurement is usually determined according to the application to which filter assembly 10 is to be put and the contaminant which filter assembly 10 is intended to filter. Next, the optimal outside diameter of the finished cartridge assembly 10 is determined. Finally, a formula is used to determine the inside diameter of outer shroud 40 required to enclose the filter body 36 properly around support member 20. Thus, the variable dimension for achieving the proper frictional engagement is the inside diameter of outer shroud 40.

Filter cartridge assembly 10 must be able to filter very small particles from the fluid being passed through it. For example, the filtration capabilities of filter assembly 10 may be, but is not limited to, 200 microns. To ensure that no particle greater than 200 microns passes through filter assembly 10, a mechanical seal must be achieved at the seams of the wrapped filter body 36. One way to achieve such seals is to extend the width of filter medium 30 at the leading edge 43, seen in FIGS. 2, 3 and 5. As each new spiral wrap is formed, the exposed leading edge 43 of partially formed filter assembly 10 includes an exposed layer of filter body 36. This exposed layer of filter body 36 is overlapped by the filter body of the trailing edge 45 as trailing edge 45 lays flush with the exposed portion of outer shroud 40 from the previous wrap. Filter body 36 is sealed by pressure from the cold-rolled wrapping process through the creation of a double dense filter body at the overlapping intervals.

The overlapping intervals may be any predetermined width, and they may vary along the length of filter assembly 10. For illustrative purposes, the overlapping intervals may be 2 to 6 inches wide, or greater or less, depending partially upon the width of metal sheet 46. Sheet 46 may, for example, be 5 inches wide, with the overlapping intervals being in the range of 1 to 2.5 inches, or possibly less.

Figure 6:
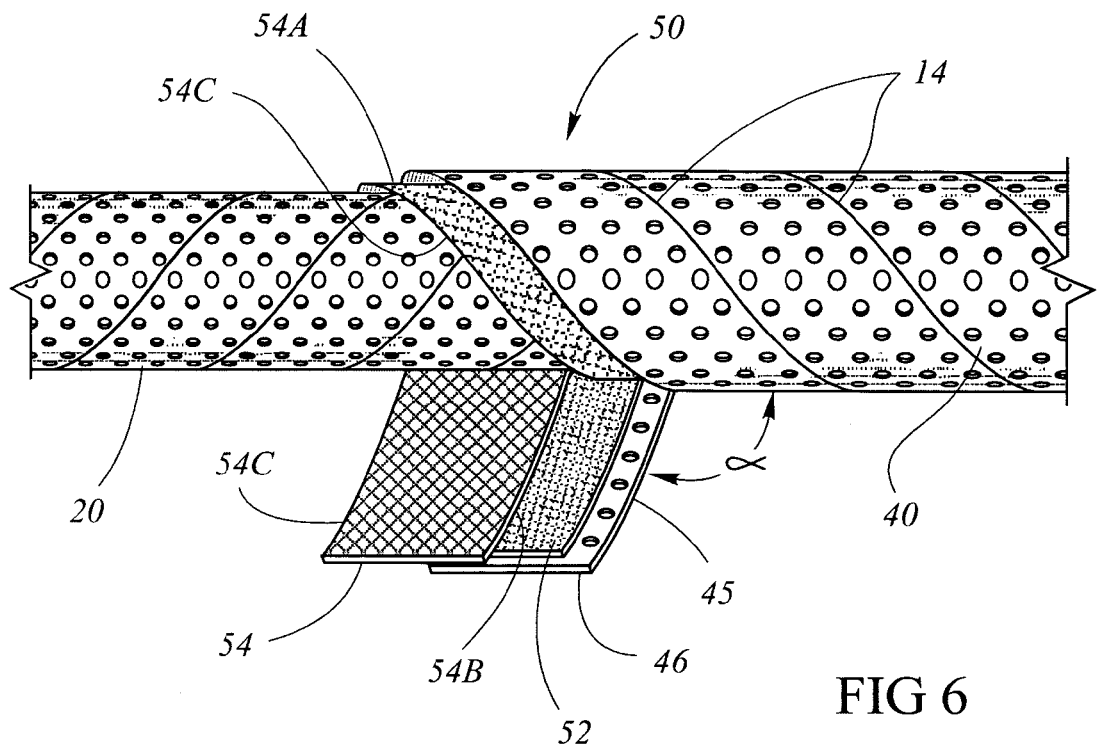
FIG. 6 is a side elevational view of an alternative embodiment of a partially formed cartridge assembly having multiple layers of filter media.

Referring now to FIG. 6, an alternative embodiment to the filter cartridge assembly thus far described is shown. Filter cartridge assembly 50 is shown having the same inner support 20 and metal sheet 46 which is formed into outer shroud 40 with welds 14. However, the filter body of cartridge 50 is made up of multiple layers of filter media 52, 54. Before metal sheet 46 and layers 52, 54 are spirally wrapped, layer 52 is placed on top of metal sheet 46, typically offset from the trailing edge 45 of metal sheet 46 as shown in FIG. 6. This offset of layer 52 helps prevent layer 52 from being damaged by the welding at seams 14. Then, layer 54 is placed on top of layer 52, staggered or offset in the manner shown in FIG. 6. Upon the completion of each spiral wrap, a wrapped portion 54a of layer 54 remains exposed. Portion 54a is then wrapped over by layer 52 upon completion of the next spiral wrap, with trailing edge 54b of the new wrapped layer 54 substantially aligning with the leading edge 54c of the previously wrapped layer 54. Typically, the widths of each of layers 52, 54 will be less than the width of metal sheet 46, although the total width of the offset layers 52, 54 will be greater than the width of metal sheet 46. Also, the aligned edges 54b and 54c of the completed portion of cartridge 50 will usually not be perfectly flush, thereby creating gaps between aligned layers of filter media. These gaps are shown and described below with reference to FIG. 7.

Figure 7:
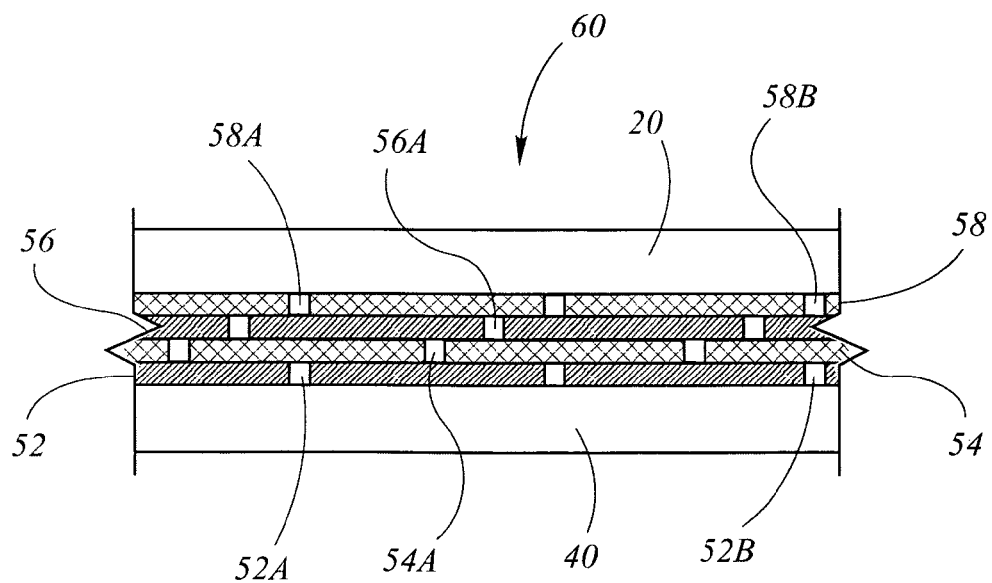
FIG. 7 is a longitudinal, cross-sectional view of an alternative embodiment of the finished portion of the filter cartridge assembly of FIG. 6, showing one half of the cartridge assembly.

Referring to FIG. 7, a cross-sectional portion of a completed filter cartridge assembly is shown depicting an alternative to the embodiment shown in FIG. 6. The longitudinal portion 60 of a finished cartridge assembly shows the inner support 20 and outer shroud 40 surrounding multiple layers 52, 54, 56, 58 of filter media. Cartridge 60 has four layers of filter media instead of just two, as shown in FIG. 6, although the number of layers may vary depending on the desired specifications. Support 20, shroud 40, and the layers 52, 54, 56, 58 are formed in the same way as shown in FIG. 6, with each filter media layer being offset or staggered from each preceding layer and/or subsequent layer of filter media when positioned on top of metal sheet 46 before spiral wrapping has occurred. Upon completion of the spiral wrapping process, the new layers of filter media are wrapped over the exposed, previously wrapped layers of filter media to form the completed layers as shown in FIG. 7. The aligned edges of the filter media layers typically do not sit perfectly flush, causing gaps to be formed at the edges, such as gaps 52a, b. However, a desirable mechanical seal is formed between the inner support 20 and outer shroud 40 because the gaps are not radially aligned. For example, because the filter layers 52, 54, 56, 58 are offset from each other before being wrapped, the gaps 52a, b are not radially aligned with the gap 54a. Likewise, gap 54a is not aligned with gap 56a, and gap 56a is not aligned with gaps 58a, b as shown in FIG. 7. Each of the filter layers overlaps any gap formed between edges of adjacent layers. Upon completion of the wrapping process, the outer filter layer 52 will be in full mechanical contact with the inner surface of outer shroud 40, as will the inner filter layer 58 be in full mechanical contact with the outer surface of inner support 20. This is also typical of the previously described embodiments.

As was previously described, the width of each individual layer of filter media is preferably less than the width of metal sheet 46. When each layer becomes wider than metal sheet 46, and as more layers of filter media are added, the overlapping filter layers begin to interfere with each other as wrapping continues, and the outer shroud of the cartridge assembly loses its uniform shape. To maintain a desired, uniform outer shroud shape, the widths of the filter layers should be less than the width of metal sheet 46. By doing this, multiple layers of filter media can be incorporated into the spiral wrapping process without filter layer interference and subsequent mis-shaping of the outer shroud.

The multiple layers of filter media of the several embodiments thus far described may have different filter mesh capacities. The exact filter mesh capacities of each layer within a single cartridge assembly will be determined by customer specifications. However, it should be understood that the mesh capacities of different layers of filter media within a single cartridge assembly may very from very coarse to very fine. For example, the cartridge assembly could contain two coarse layers of filter media, one in contact with the inner support and one in contact with the outer shroud, and two fine layers disposed between the two coarse layers. Such a cartridge assembly would contain 4 layers of filter media, although the number of layers may vary.

In an alternative embodiment, filter cartridge assembly 10 is produced without inner support member 20. Inner support member 20 is not needed to form cartridge assembly 10. However, without inner support member 20, it is possible that filter body 36 could separate from outer shroud 40 since it is not welded in any fashion or connected to outer shroud 40. Also, filter body 36 could collapse without the inner support provided by support member 20. However, this alternative embodiment is beneficial if the production pipe to which the filter assembly is to be attached would provide the inner support needed, and the filter assembly would be installed before any outside stimulus would cause filter body 36 to separate from outer shroud 40.

In the preferred embodiment, the finished cartridge assembly 10 is not a stand-alone cartridge, meaning that the assembly 10 must be attached to a base pipe to operate properly. Mainly, this is because the ends 16 of assembly 10 in FIG. 1 are left unfinished, thereby exposing filter body 36, which is held in place by the friction binds. As mentioned earlier, this configuration eliminates the time and expense needed to connect the ends 16. This configuration also eliminates the need for end portions that would enable assembly 10 to be connected to a base pipe, such as additional connectors or threaded pin ends. With the current configuration, the ends would simply be welded together when the user welds the assembly 10 to a base pipe. Welding serves to both attach assembly 10 to the base pipe and close off and seal the ends 16 of assembly 10, which is much easier and less expensive than manufacturing connecting means. However, the filter assembly 10 may include connectors or threaded pin or box ends to connect to a base pipe as desired.

Cartridge assembly 10, whether formed with or without inner support member 20, may be placed over a base pipe, then welded to the base pipe to create a finished cartridge. Alternatively, the assembly 10 may be spirally wrapped, as previously described, around a base pipe. Preferably, the inner support member is wrapped around the base pipe first and then welded at the seams, followed by the spiral wrapping of the filter and outer shroud. The inner support member, filter, and outer shroud components may be spirally wrapped substantially simultaneously around the base pipe, although this would tend to make welding of the inner support member undesirably difficult.

Because the method of the present invention uses a continuous spiral wrapping process, the operator is able to continuously produce the filter cartridge assembly through the mill, and stop the mill and cut the cartridge assembly at any length desired. This creates great flexibility in manufacturing the filter assembly 10 since the assembly may be cut at any length as no pre-determined parameter of the spiral wrapping process causes the final length of the filter assembly 10 to also be pre-determined.

A primary advantage of one embodiment of the present invention is the ability to achieve frictional engagement between the filter and the inner support and between the filter and the outer support. A frictional bind eliminates the need for welding and sintering of the filter body, thereby avoiding the problems previously described.

Another advantage of an embodiment of the present invention is the elimination of a swaging step to reduce the diameter of the outer shroud. The simultaneous and continuous cold-rolled wrapping of the outer shroud and filter body makes the additional step of swaging unnecessary, thereby also avoiding the previously described problems with swaging.

Other advantages include the previously described flexibility in manufacturing different lengths of filter cartridges, and having a filter cartridge with a spirally wrapped filter body. A spirally wrapped filter body is stronger and more flexible than a longitudinally wrapped filter body. A spirally wrapped filter body bends more easily while a longitudinally wrapped filter body tends to kink. These same characteristics apply to spirally wrapped inner and outer supports. Moreover, a spirally wrapped filter body has increased filtration versatility as the filtration capability of the filter may be adjusted by changing the overlapping intervals of the filter layers.

The above discussion is meant to be illustrative of the principles and various embodiments of the present invention. While the preferred embodiment of the invention and its method of use have been shown and described, modifications thereof can be made by one skilled in the art without departing from the spirit and teachings of the invention. The embodiments described herein are exemplary only, and are not limiting. Many variations and modifications of the invention and apparatus and methods disclosed herein are possible and are within the scope of the invention. Accordingly, the scope of protection is not limited by the description set out above, but is only limited by the claims which follow, that scope including all equivalents of the subject matter of the claims.

What is claimed is:

1. A method of manufacturing a well filter for filtering a radial flow of well fluids, the method comprising: laying a filter medium onto a metal sheet with the filter medium being unconnected to the metal sheet and forming a filter medium/metal sheet combination; and with the filter medium being together on the metal sheet, performing a helical wrap of the filter medium/metal sheet combination onto a perforated tubular member; the metal sheet frictionally engaging the filter medium to retain the filter medium between the metal sheet and the perforated tubular member.

2. The method of claim 1 further comprising:
overlapping edges of the filter medium during the helical wrap of the filter medium/metal sheet combination; and
providing a mechanical seal in the filter medium.

3. The method of claim 2 wherein a plurality of overlapping edges are disposed between the metal sheet and the perforated tubular member for every width of the helically wrapped metal sheet.

4. The method of claim 1 wherein the helical wrap of the filter medium/metal sheet combination is performed to a diameter of the metal sheet that achieves a pre-determined frictional engagement between the perforated tubular member, the filter medium and the metal sheet.

5. The method of claim 1 wherein the filter medium comprises a plurality of filter layers.

6. The method of claim 5 wherein each of the plurality of filter layers and the metal sheet have a width, the width of each of the plurality of filter layers being equal to or less than the width of the metal sheet.

7. The method of claim 5 wherein one of the filter layers includes adjoining filter sheets having a seam between the adjoining filter sheets, and the seam is substantially offset from seams in adjacent filter layers.

8. The method of claim 1 further including:
helically wrapping a perforated sheet around a mandrel; and
welding edges of the wrapped perforated sheet to form the perforated tubular member before performing the helical wrap of the filter medium/metal sheet combination.

9. The method of claim 8 further including separating the perforated tubular member from the mandrel before performing the helical wrap of the filter medium/metal sheet combination.

10. The method of claim 8 wherein the mandrel is a base pipe and further including attaching the perforated tubular member, the filter medium and the metal sheet to the base pipe.

11. The method of claim 1 wherein each helical wrap of the metal sheet is substantially flush with the immediately preceding helical wrap, forming seams between each helical wrap of the metal sheet.

12. The method of claim 11 wherein the metal sheet is welded at the seams.

13. The method of claim 1 wherein the metal sheet is perforated.

14. The method of claim 1 wherein the metal sheet is made from any one of stainless steel and carbon steel.

15. The method of claim 1 wherein the perforated tubular member is made from any one of polymer and stainless steel.

16. The method of claim 1 further including attaching a connecting means to at least one end of the well filter.

17. The method of claim 16 wherein said connecting means is any one of a threaded pin end and a box end.

18. The method of claim 1 further including cold-rolling the filter medium/metal sheet combination around the perforated tubular member.

19. The method of claim 1 further including welding the well filter to an adjacent length of well pipe.

20. The method of claim 1 wherein the metal sheet alternatively resists radially inward and outward forces acting on the well filter.

21. The method of claim 1 wherein, prior to performing the helical wrap of the filter medium/metal sheet combination, directing the filter medium/metal sheet combination into a mill with the metal sheet on top of the filter medium.

22. The method of claim 1 further including:
ceasing performing the helical wrap;
measuring the helically wrapped metal sheet and filter medium and the perforated tubular member to a desired length;
cutting the helically wrapped metal sheet and filter medium and the perforated tubular member at the measured length; and
continuing performing the helical wrap.

23. A method of manufacturing a well screen for filtering a radial flow of well fluids, the method comprising: laying a filter medium onto a metal shroud with the filter medium being unconnected to the metal shroud and forming a filter medium/metal shroud combination; with the filter medium being together on the metal shroud, performing a helical wrap of the filter medium/metal shroud combination around a mandrel; the metal shroud frictionally engaging the filter medium to retain the filter medium between the metal shroud and the mandrel; and separating the filter medium and metal shroud from the mandrel.

24. The method of claim 23 further including attaching the filter medium to the metal shroud.

25. The method of claim 23 further comprising:
applying the helically wrapped filter medium and metal shroud to a base pipe; and
welding ends of the helically wrapped filter medium and metal shroud to attach and seal the filter medium and metal shroud.

26. The method of claim 23 wherein the mandrel is a base pipe and the filter medium and metal shroud are attached to the base pipe to form the well screen.

27. A method of manufacturing a well filter for filtering a radial flow of well fluids, the method comprising: laying a plurality of filter sheets onto a metal sheet; offsetting edges of the filter sheets such that a series of overlapped filter sheets is in contact with the metal sheet; and with the offset and overlapped filter sheets being together on the metal sheet, performing a helical wrap of the filter sheets and metal sheet onto a perforated tubular member; the metal sheet frictional engaging the filter sheets to retain the filter sheets between the metal sheet and the perforated tubular member.

28. The method of claim 27 wherein:
the filter medium comprises a plurality of offset and overlapping filter layers, and the helical wrapping of the offset filter layers causes a mechanical seal in the filter medium; and
each helical wrap of the metal sheet is substantially flush with the immediately preceding helical wrap, forming seams between each helical wrap of the metal sheet, and the metal sheet is welded at the seams.

29. A method of manufacturing a well filter having a pre-determined outer diameter for filtering a radial flow of well fluids, the method comprising: stacking together a flat filter medium and a flat perforated metal sheet; and performing a helical wrap of the stacked filter medium and perforated metal sheet onto a perforated metal tubular member such that the perforated metal sheet forms a tubular outer shroud having the pre-determined diameter to create a frictional engagement between the outer shroud, the filter medium and the perforated metal tubular member.

30. The method of claim 29 wherein the flat filter medium comprises a plurality of offset and overlapping filter layers that cause a mechanical seal when wrapped between and frictionally engaged with the outer shroud and the perforated metal tubular member.

31. The method of claim 29 further including welding the well filter to an adjacent length of well pipe.

32. The method of claim 29 wherein the outer shroud alternatively resists radially inward and outward forces acting on the well filter.

* * * * *